Patented Sept. 9, 1941

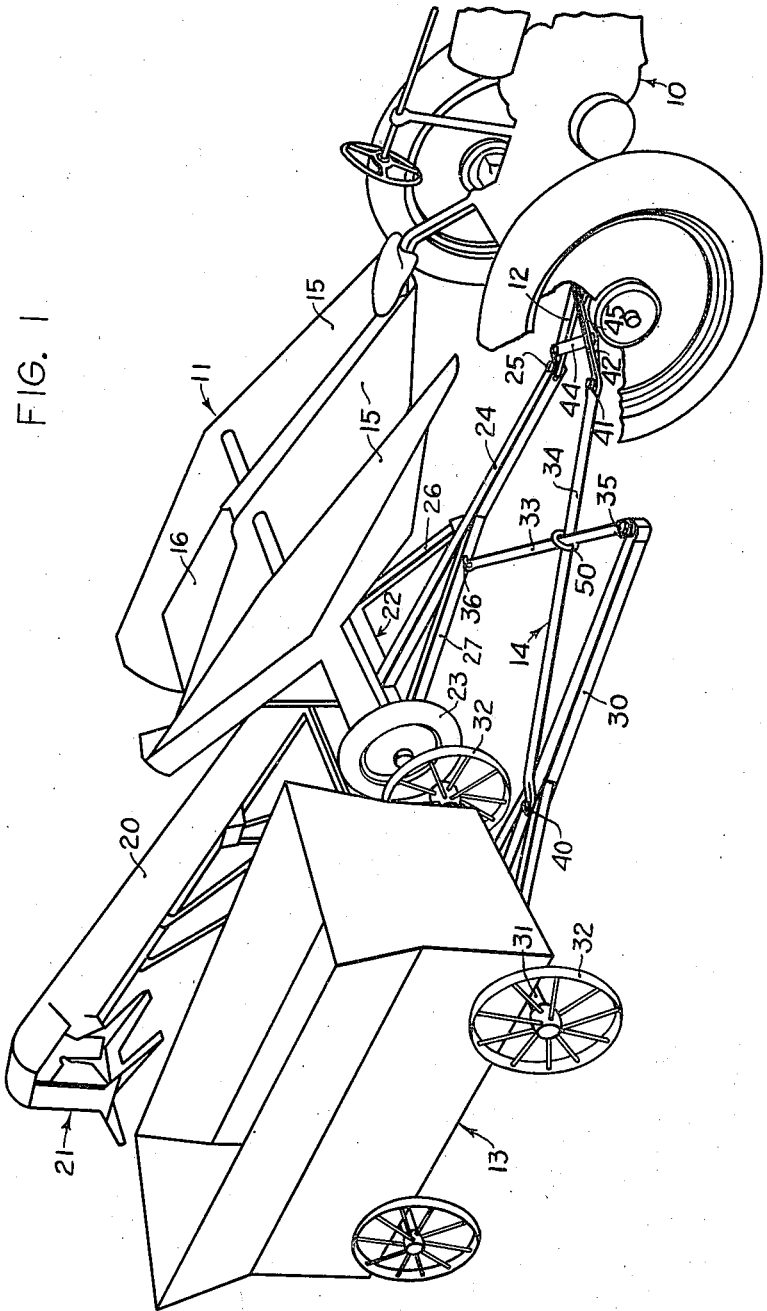

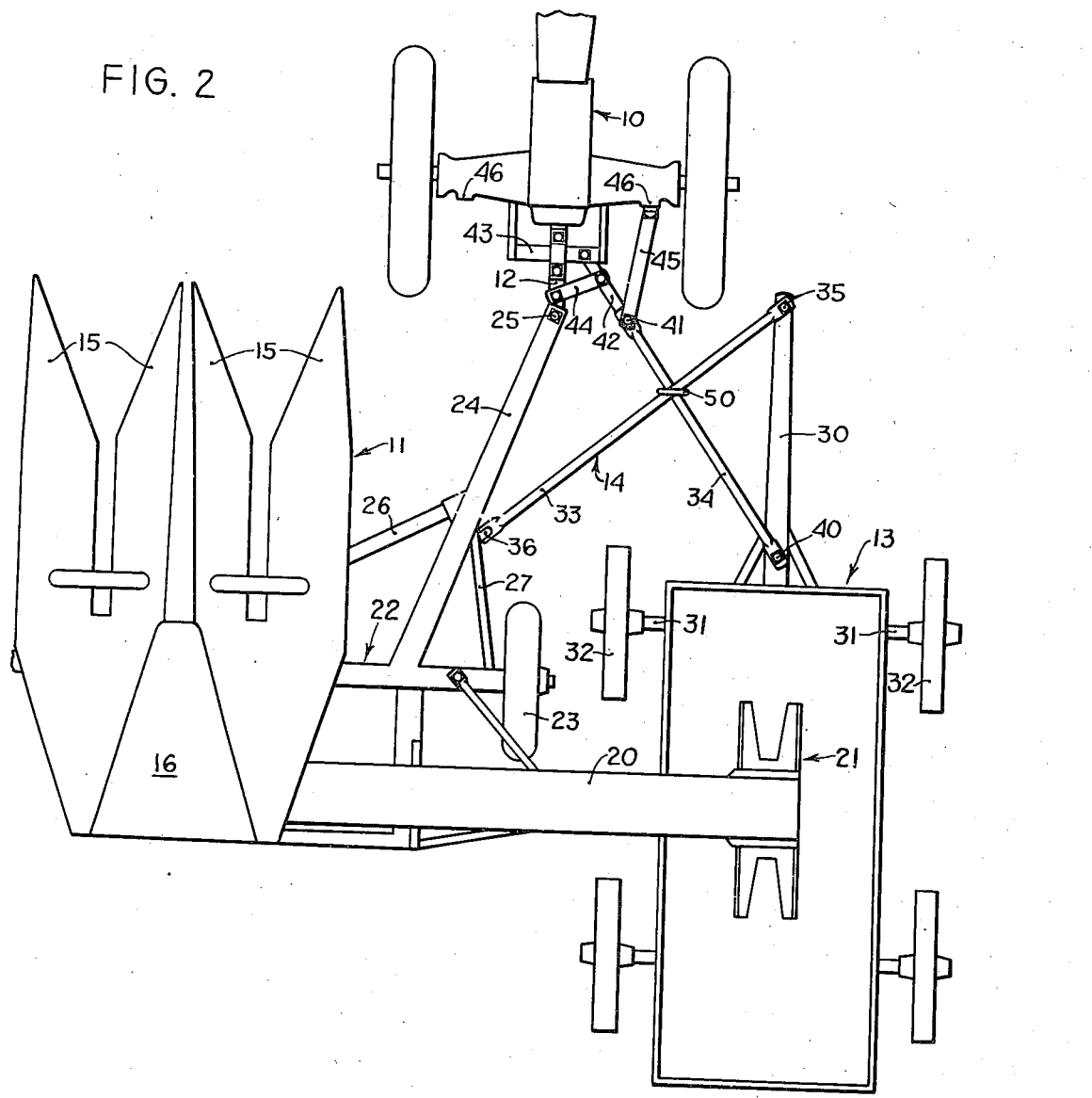

2,255,281

UNITED STATES PATENT OFFICE 2,255,281

WAGON HITCH

Russell L. Dort, Davenport, Iowa, assignor to Deere & Company, Moline, Ill., a corporation of Illinois Application December 16, 1940, Serial No. 370,324

6 Claims. (Cl. 280—33.44)

The present invention relates to draft connections and more particularly to a device for hitching a wagon to the rear end of a tractor to which an agricultural implement, such as a corn picker, is also attached. The purpose of such a draft connection is to enable the wagon to be towed along side the corn picker in position to receive the ears of corn from the laterally extending elevator conveyor of the implement, and the draft device, in addition to pulling the wagon, must effect steering guidance thereof so as to maintain the wagon under the end of the elevator conveyor.

The principal object of the invention is to provide an improved draft connection of this type which is so constructed and arranged that the front end of the wagon draft tongue is held at the proper height solely by the draft connection itself, thereby eliminating the chains or other devices heretofore required to hold the draft tongue up. In the accomplishment of this object, I employ a pair of crossed links which are connected to the front and rear ends of the wagon draft tongue and to the implement and the tractor drawbar, the link which is attached to the front end of the wagon tongue being supported by the other link connected to the rear end of the wagon tongue, whereby the tongue is carried by the latter link.

Other objects and advantages of my invention will become apparent to those skilled in the art after consideration of the following detailed description of the preferred embodiment thereof, reference being had to the accompanying drawings, in which:

Figure 1 is a perspective view of a tractor drawn two-row corn picker with a wagon disposed alongside thereof, and a draft connection constructed in accordance with my invention connecting the wagon to the tractor and the corn picker; and Figure 2 is a top plan view of the same.

Referring now to the drawings, I have illustrated a tractor 10, a two-row corn picker 11 hitch-connected to the drawbar 12 of the tractor, and a wagon 13 connected with the tractor and with the implement by means of my improved draft device which is indicated in its entirety by the reference numeral 14. The corn picker 11 has the usual gathering arms 15 and a husking unit 16, with a conveyor elevator 20 extending laterally and upwardly from one side thereof. The upper end of the elevator 20 terminates in a distributing head 21 which is disposed directly above the wagon 13 and which distributes the ears of corn uniformly over the wagon without necessitating moving the wagon longitudinally relative to the conveyor 20. The corn picker is mounted on a generally transversely disposed frame 22 which is supported on wheels 23. A draft tongue 24 is fixed to the frame 22 and extends forwardly and laterally therefrom, the front end of the tongue being connected by a pin 25 to the tractor drawbar 12. Forwardly converging bracing members 26 and 27 are fixed to the frame 22 and are joined to the tongue 24 to strengthen the latter.

The wagon 13 is provided with a forwardly extending draft tongue 30 which is connected in the usual way with the front axle 31 of the wagon to steer the front wheels 32.

The draft device 14 connecting the wagon to the tractor and to the corn picker comprises a pair of crossed links 33 and 34. Link 33 is connected by a pivot bolt 35 to the front end of the wagon tongue 30 and by a shackle 36 to the brace member 27 on the corn picker. Link 34 is connected at 40 to the rear end portion of the wagon tongue 30, and by a pivot bolt 41 to a bar 42 which is fixed to a draft frame 43 on the tractor. The bar 42 is rigidly braced by means of a short bar 44 which is fixed to the tractor drawbar 12 and is bolted to the bar 42 intermediate its ends, and also by a strut 45. The strut 45 is bolted to one of two rearwardly facing implement mounting bosses 46 provided on the rear axle housing of the tractor, and is joined to the bar 42 and link 34 by the pivot bolt 41.

In the preferred construction, link 33 overlies and rests upon link 34, and the two links are connected together at their point of intersection by a ring 50 which embraces the links and allows a limited amount of relative movement therebetween so as to facilitate turning. Link 34, being held at one end by the rigid draft frame structure 42, 44, 45 and at the other end by the rear end of the wagon tongue 30 relatively close to the axle 31, is maintained at a substantially constant height above the ground. Link 33, being held at its rear end by the corn picker frame 22 and being further supported on link 34, is likewise maintained at a substantially constant height above the ground. Accordingly, the front end of the wagon tongue 30, being fixed to the front end of the link 33, is supported by said link 33 at a suitable height above the ground for good steering control.

The wagon tongue 30 is steered by the links 33, 34 when the tractor is turned, the steering geometry being determined by the relative lengths of the links, and the relative positions of the pivots. In general, it can be said that when the tractor is turned to the right, the point 41 moves rearwardly relative to the point 25 which causes the link 34 and pivot 40 to fall back relative to the implement. The front end of the tongue 30, however, is swung by the link 33 through an arc about the point 36 with the net result that the tongue is turned to the right to follow the tractor. Likewise, when the tractor is turned to the left, the point 41 moves ahead relative to the point 25, causing the link 34 and point 40 to be pulled forwardly relative to the implement. At the same time, link 33 causes the front end of the tongue 30 to swing to the left about the point 36 as a center, thereby steering the wagon to follow the tractor.

What I claim as my invention is:

1. For use with a tractor having an implement connected therewith, and a vehicle disposed to travel alongside the implement, said vehicle having a forwardly extending draft tongue, a draft device for connecting the vehicle to the tractor and implement comprising a pair of crossed links, the first of said links being connected at one end to the front end of the vehicle tongue and at the other end to the implement, the second of said links having one end connected with the vehicle at a point rearwardly of the front end of the tongue, and the other end supported on the tractor drawbar, and said first link being supported on said second link.

2. For use with a tractor having an implement connected therewith, and a vehcile disposed to travel alongside the implement, said vehicle having a forwardly extending draft tongue, a draft device for connecting the vehicle to the tractor and implement comprising a pair of crossed links, the first of said links being connected with the vehicle tongue adjacent the front end thereof and with the implement at a point spaced rearwardly from the hitch connection with the tractor, the second of said links being connected with the vehicle and with the tractor drawbar, and means connecting said links together whereby said first link is supported on said second link and the front end of the vehicle tongue is supported by the first link.

3. For use with a tractor having an implement connected therewith, and a vehicle disposed to travel alongside the implement, said vehicle having a forwardly extending draft tongue, a draft device for connecting the vehicle to the tractor and implement comprising a pair of crossed links, the first of said links being connected with the vehicle tongue adjacent the front end thereof and with the implement at a point spaced rearwardly from the hitch connection with the tractor, the second of said links having one end connected with the vehicle tongue at a point spaced rearwardly from the front end thereof, and means for holding the other end of said second link substantially in fixed vertical position with respect to implement, said first link overlying and resting upon said second link and supporting the front end of the vehicle tongue.

4. For use with a tractor having an implement connected therewith, and a vehicle disposed to travel alongside the implement, said vehicle having a forwardly extending draft tongue, a draft device for connecting the vehicle to the tractor and implement comprising a pair of crossed links, the first of said links being connected with the vehicle tongue adjacent the front end thereof and with the implement at a point spaced rearwardly from the hitch connection with the tractor, the second of said links being connected with the vehicle and with the tractor drawbar, and a ring embracing said links at their point of intersection to support said first link from said second link, said first link serving to support the front end of the vehicle tongue.

5. For use with a tractor having an implement connected therewith, and a vehicle disposed to travel alongside the implement, said vehicle having a forwardly extending draft tongue, a draft device for connecting the vehicle to the tractor and implement comprising a pair of crossed links, the first of said links being connected with the vehicle tongue adjacent the front end thereof and with the implement at a point spaced rearwardly from the hitch connection with the tractor, the second of said links being connected at one end with the vehicle, and means for holding the other end of said second link substantially in fixed vertical position with respect to the implement, said first link being supported by said second link to hold the front end of the vehicle tongue in raised position.

6. In combination with a tractor and implement train and a vehicle disposed to travel alongside the implement and having a forwardly extending draft tongue, of a draft device for connecting the vehicle to the train comprising a pair of crossed links, one of said links being connected at one end to the vehicle near the rear end of said tongue and at the other end to the train, and the other of said links being connected at one end to said tongue at a point spaced forwardly of the point of connection of said one link with the vehicle and at the other end to the train, said other link being supported by said one link to hold the front end of the vehicle tongue in raised position.

RUSSELL L. DORT.